US010372151B2

(12) United States Patent
Stuart et al.

(10) Patent No.: US 10,372,151 B2
(45) Date of Patent: Aug. 6, 2019

(54) ADJUSTABLE CLAMPING MECHANISM FOR A THROTTLE CONTROL

(71) Applicant: Williams Controls, Inc., Porrtland, OR (US)

(72) Inventors: Colt Kincade Stuart, Lake Oswego, OR (US); Craig Allen McConnell, Oregon City, OR (US)

(73) Assignee: WILLIAMS CONTROLS, INC., Portland, OR (US)

( * ) Notice: Subject to any disclaimer, the term of this patent is extended or adjusted under 35 U.S.C. 154(b) by 25 days.

(21) Appl. No.: 16/043,406

(22) Filed: Jul. 24, 2018

(65) Prior Publication Data

US 2019/0025871 A1    Jan. 24, 2019

Related U.S. Application Data

(60) Provisional application No. 62/536,252, filed on Jul. 24, 2017.

(51) Int. Cl.
*B60K 26/02* (2006.01)
*G05G 5/22* (2006.01)
(Continued)

(52) U.S. Cl.
CPC .............. *G05G 5/22* (2013.01); *B60K 26/02* (2013.01); *F16B 2/065* (2013.01); *F16B 2/185* (2013.01);
(Continued)

(58) Field of Classification Search
CPC ........ B62K 23/06; B62K 23/04; B62K 23/02; B62K 21/12; B62K 21/16; B62K 21/26;
(Continued)

(56) References Cited

U.S. PATENT DOCUMENTS 3,948,361 A * 4/1976 Carlson ..................... B62L 3/06
                                                                188/24.18
4,213,513 A * 7/1980 Beck ..................... B60K 28/00
                                                                123/198 DC
(Continued)

FOREIGN PATENT DOCUMENTS

CA      2 877 657 A1    1/2014
EP      2 282 927 B1    1/2017
(Continued)

OTHER PUBLICATIONS

International Search Report for corresponding International Application No. PCT/US2018/043373 dated Oct. 30, 2018.
(Continued)

*Primary Examiner* — Richard W Ridley
*Assistant Examiner* — Brian J McGovern
(74) *Attorney, Agent, or Firm* — Pearne & Gordon LLP

(57) ABSTRACT

An adjustable clamping mechanism for a throttle control device on a handlebar of a vehicle includes a throttle lever and a clamp assembly that retains the throttle control device at a desired angular position upon said handlebar. The clamp assembly includes a body having a main section and a secondary section, the secondary section being disposed in a slot of the main section. A clamping member provides a clamping force upon the main section and secondary section. In an engaged position of the clamping member, the clamping member provides a clamping force to retain the throttle lever in a predetermined angular orientation upon said handlebar during operation of said vehicle. In a disengaged position of the clamping member, the clamping member does not provide the clamping force in order to permit the throttle lever to rotate about a longitudinal axis of said handlebar.

16 Claims, 10 Drawing Sheets

(51) Int. Cl.
*F16B 2/06* (2006.01)
*F16B 2/18* (2006.01)

(52) U.S. Cl.
CPC ...... *B60Y 2300/43* (2013.01); *G05G 2505/00* (2013.01)

(58) Field of Classification Search
CPC ............ B62K 11/14; B62L 3/02; B62L 3/026; B62M 25/04; B60T 7/10; B60T 7/08; B60K 26/02
See application file for complete search history.

(56) References Cited

U.S. PATENT DOCUMENTS

| | | | |
|---|---|---|---|
| 4,899,610 A | 2/1990 | Bourret | |
| 5,404,769 A * | 4/1995 | Kao | B62K 21/16 280/279 |
| 6,840,096 B2 | 1/2005 | Samoto et al. | |
| 6,920,805 B2 | 7/2005 | Samoto et al. | |
| 7,735,470 B2 | 6/2010 | Palfenier et al. | |
| 8,491,348 B2 | 7/2013 | Simard et al. | |
| 8,567,282 B2 | 10/2013 | Yaguchi | |
| 9,481,370 B2 | 11/2016 | Bernier et al. | |
| 2004/0065165 A1 | 4/2004 | Sekiya et al. | |
| 2009/0078076 A1 * | 3/2009 | Chen | B62K 21/16 74/551.8 |
| 2010/0182017 A1 | 7/2010 | Reddy et al. | |
| 2011/0036196 A1 | 2/2011 | Menghini | |
| 2015/0096406 A1 * | 4/2015 | Miki | B62K 23/02 74/494 |
| 2015/0183321 A1 | 7/2015 | Lefebvre et al. | |
| 2017/0037894 A1 * | 2/2017 | Miyazaki | B62K 23/06 |

FOREIGN PATENT DOCUMENTS

| | | |
|---|---|---|
| JP | 2007-069635 A | 3/2007 |
| JP | 2009-127526 A | 6/2009 |
| WO | 2017002714 A1 | 1/2017 |
| WO | 2017/046731 A1 | 3/2017 |

OTHER PUBLICATIONS

Written Opinion for corresponding International Application No. PCT/US2018/043373 dated Oct. 30, 2018.

* cited by examiner

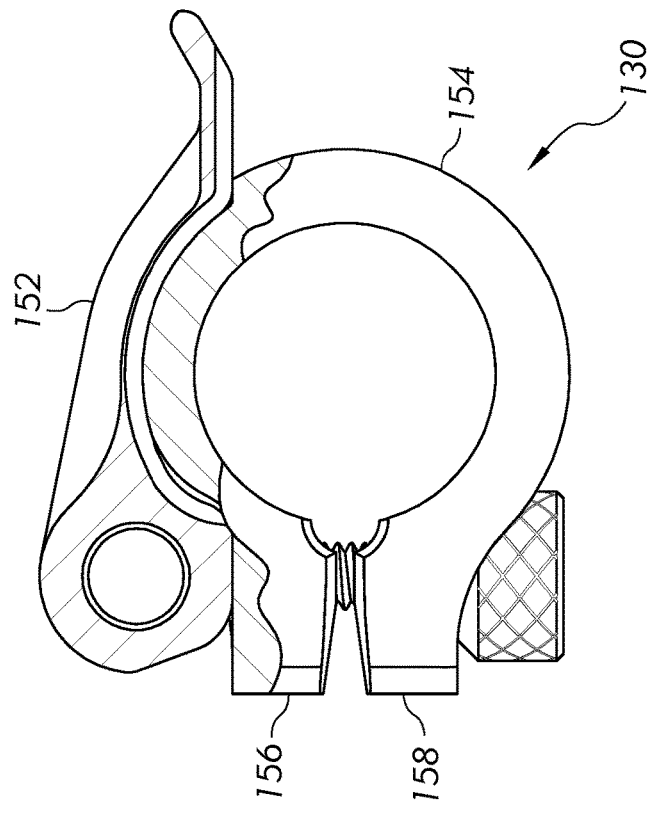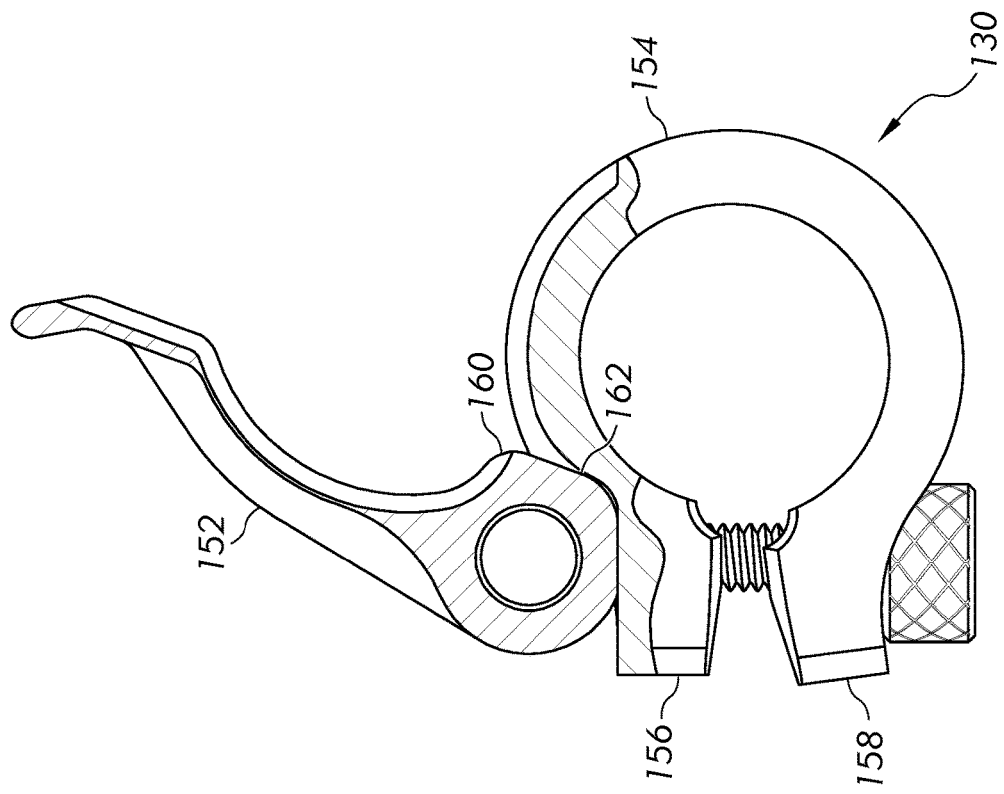

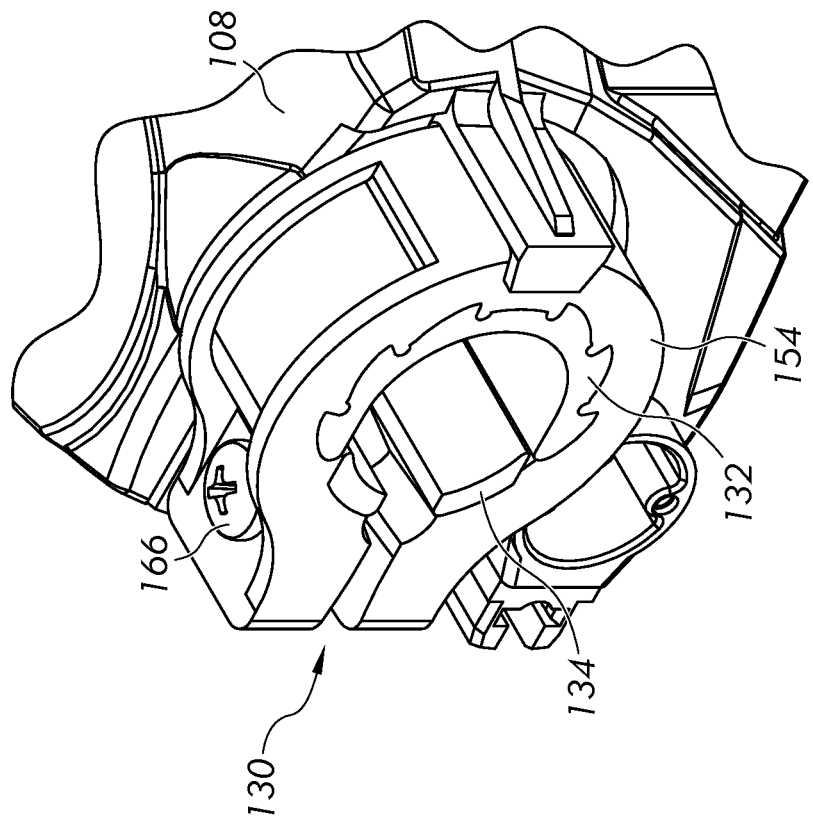
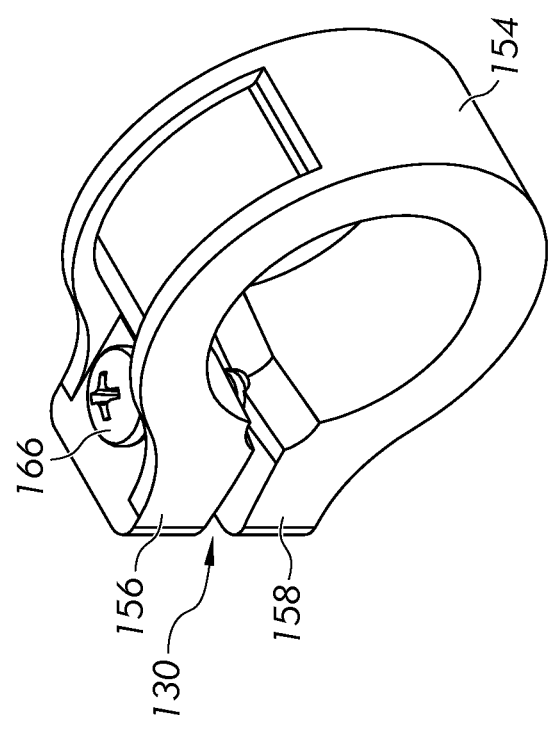
FIG. 7B
FIG. 7A

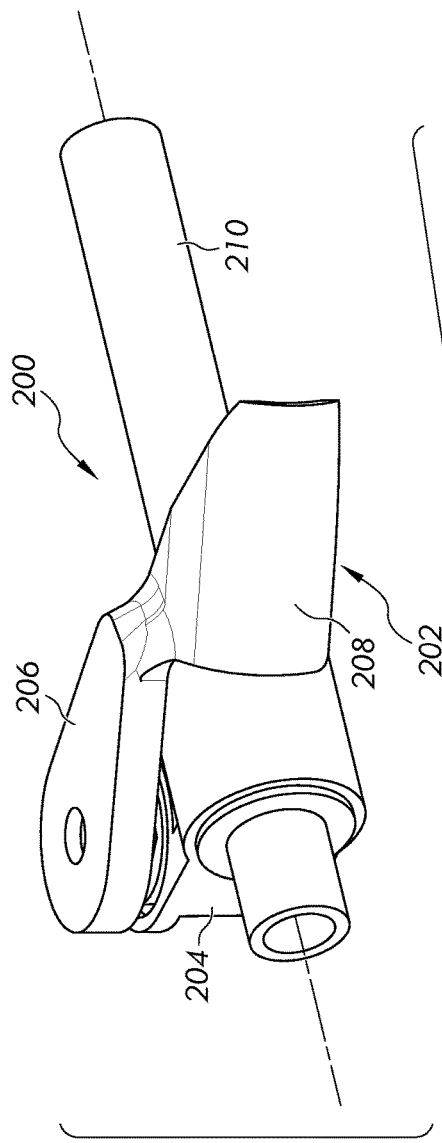
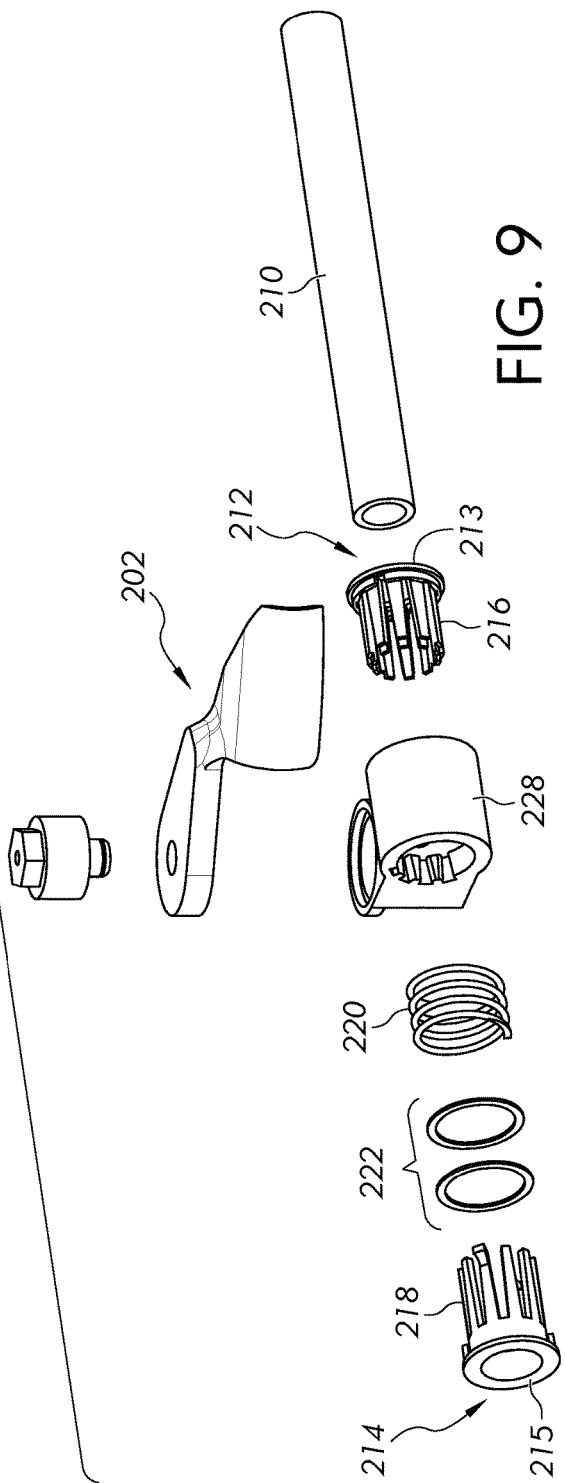
FIG. 8
FIG. 9

ADJUSTABLE CLAMPING MECHANISM FOR A THROTTLE CONTROL

CROSS-REFERENCE TO RELATED APPLICATIONS

This application claims the benefit of U.S. Provisional Application Ser. No. 62/536,252 filed Jul. 24, 2017, the contents of which are incorporated herein in their entirety by reference.

FIELD OF THE INVENTION

This application relates generally to a throttle control device for vehicles (e.g., all-terrain vehicles (ATVs), quads, motorcycles, snowmobiles, personal watercrafts, utility vehicles, material handling vehicles, etc.), and more particularly, to an adjustable throttle control device and a method of adjusting a position or orientation of said throttle control device.

BACKGROUND OF THE INVENTION

Snowmobiles and other vehicles used for recreational purposes such as all-terrain vehicles (ATVs), quads, motorcycles, personal watercrafts, etc., have a handlebar for steering and a throttle control device located on the handlebar for adjusting the speed at which the vehicle is traveling. Generally, such throttle control devices include an actuation mechanism, controlled by an operator, for modifying the vehicle engine's rotations per minute (R.P.M.)

Conventionally, a throttle control device is positioned about a handlebar and secured thereto (e.g., via fastening screws, adhesives, etc.) in a specific orientation. This orientation is generally chosen by the manufacturer of the vehicle. Specifically, the manufacturer analyzes various sized operators on the vehicle (i.e., in a riding position) and selects the orientation most ergonomically comfortable to the vast majority of said operators.

During operation of the vehicle, the operator may need to reposition himself/herself in order to better perform a specific maneuver. Due to the static nature of the throttle control device (i.e., the throttle control device remains in its original orientation chosen by the manufacturer), the operator's repositioning is limited by the continual engagement with the throttle control device. That is, the operator may wish to reposition himself/herself to a greater extent, but doing so would result in disengagement with the throttle control device.

BRIEF SUMMARY OF THE INVENTION

In accordance with one aspect, there is provided an adjustable clamping mechanism for a throttle control device on a handlebar of a vehicle. The adjustable clamping mechanism includes a throttle lever that forms an adjustable arcuate angle with respect to said handlebar and is pivotally movable relative thereto. The throttle lever is provided to adjust an engine speed of said vehicle.

The adjustable clamping mechanism further comprises a clamp assembly that retains the throttle control device at a desired angular position upon said handlebar. The clamp assembly comprises a body including a main section and a secondary section. The main section has a slot formed therein that is adapted to accept said handlebar. The slot includes a first interior surface that is formed complimentary to a first portion of a circumferential surface of said handlebar. The secondary section is disposed in the slot and removable with respect to the main section. The secondary section has a second interior surface that is formed complimentary to a second portion of the circumferential surface of the handlebar.

The clamping assembly further includes a clamping member that is provided to exert a clamping force upon the main section and secondary section of the body. In an engaged position of the clamping member, the clamping member provides a clamping force between the main section and the secondary section and upon the handlebar sufficient to thereby retain the throttle lever in a predetermined angular orientation upon said handlebar during operation of said vehicle. In a disengaged position of the clamping member, the clamping member does not provide the clamping force in order to permit the throttle lever to rotate about a longitudinal axis of said handlebar.

The adjustable clamping mechanism according to the foregoing aspect wherein the body further comprises an extended member that protrudes away from the body in an axial direction with respect to the handlebar. The clamping member circumferentially surrounds the extended member and is removably installed thereon with respect to the body. Further, the extended member comprises first and second segments. The first segment extends directly outwards from the main section of the body and the second segment extends directly outwards from the secondary section of the body.

In the foregoing adjustable clamping mechanism, the first segment of the extended member includes a first plurality of teeth formed on an outer circumferential surface thereof. Moreover, the clamping member has a second plurality of teeth formed on an inner circumferential surface thereof. The second plurality of teeth corresponds to the first plurality of teeth. The clamping member is a band clamp having a first member that is separate and distinct from a second member. The first and second members are secured to one another at only a single side thereof.

In the adjustable clamping mechanism, the clamping member further includes a cam lever disposed adjacent the first member. The cam lever includes a cam surface that is configured to interact with an engagement surface on the first member. In the engaged position of the clamping member, the cam surface interacts with the engagement surface in order to provide the clamping force. In the disengaged position of the clamping member, the cam surface does not interact with the engagement surface thereby not providing the clamping force.

In the foregoing adjustable clamping mechanism, the main section of the body includes a resilient arm member extending outwards in the axial direction with respect to the handlebar. The arm member has a securing member at a distal end thereof. The securing member extends in a radial direction such that, in an installed position of the clamping member, the securing member engages an outer side of the clamping member. The first and second members are secured to one another by a nut and bolt configuration.

In the adjustable clamping mechanism, the clamping member is a band clamp comprising a monolithic resilient clamp body including a first clamping protrusion disposed adjacent a second clamping protrusion. The clamping member further comprises a cam lever disposed adjacent the first clamping protrusion. The cam lever includes a cam surface that is configured to interact with an engagement surface on the clamp body In the engaged position of the clamping member, the cam surface interacts with the engagement surface in order to provide the clamping force throughout the resilient clamp body. In the disengaged position of the clamping member, the cam surface does not interact with the engagement surface thereby not providing the clamping force.

In the foregoing adjustable clamping mechanism, the main section of the body further includes a resilient arm member extending outwards in the axial direction with respect to the handlebar. The arm member includes a securing member at a distal end thereof. The securing member extends in a radial direction such that, in an installed position of the clamping member, the securing member engages an outer side of the clamping member. The first and second clamping protrusions being secured to one another by a nut and bolt configuration.

In the adjustable clamping mechanism, the secondary section of the body includes a securing protrusion and the main section of the body includes an aperture corresponding to a shape of the securing protrusion such that the securing protrusion is slidingly received within the aperture when the secondary section is disposed within the main section.

In the foregoing adjustable clamping mechanism, the throttle lever is movably secured to the main section of the body. Further still, the throttle lever is pivotably secured to the body at a top side and a bottom side of the main section.

In accordance with another aspect, there is provided an adjustable clamping mechanism for a throttle control device on a handlebar of a vehicle. The adjustable clamping mechanism includes a throttle lever that forms an adjustable arcuate angle with respect to said handlebar and is pivotally movable relative thereto. The throttle lever is provided to adjust an engine speed of said vehicle.

The adjustable clamping mechanism further comprises a clamp assembly that retains the throttle control device at a desired angular position upon said handlebar. The clamp assembly comprises a body having a through hole formed therein. The through hole being adapted to accept said handlebar.

The clamping assembly further includes a clamping member that is provided to exert a clamping force upon the body. In an engaged position of the clamping member, the clamping member provides a clamping force on the body and upon the handlebar sufficient to thereby retain the throttle lever in a predetermined angular orientation upon said handlebar during operation of said vehicle. In a disengaged position of the clamping member, the clamping member does not provide the clamping force in order to permit the throttle lever to rotate about a longitudinal axis of said handlebar.

In the foregoing adjustable clamping mechanism, the body includes a first plurality of teeth formed on an outer circumferential surface thereof, and the clamping member having a second plurality of teeth formed on an inner circumferential surface thereof. The second plurality of teeth correspond to the first plurality of teeth.

In the adjustable clamping mechanism the clamping member is a band clamp that includes a first member that is separate and distinct from a second member. The first and second members are secured to one another at only a single side thereof.

In the foregoing adjustable clamping mechanism, the clamping member is a band clamp comprising a monolithic resilient clamp body having a first clamping protrusion disposed adjacent a second clamping protrusion.

In accordance with yet another aspect, there is provided an adjustable clamping mechanism for a throttle control device on a handlebar of a vehicle. The adjustable clamping mechanism includes a throttle lever that forms an adjustable arcuate angle with respect to said handlebar and is pivotally movable relative thereto. The throttle lever is provided to adjust an engine speed of said vehicle.

The adjustable clamping mechanism further comprises a clamp assembly that retains the throttle control device at a desired angular position upon said handlebar. The clamp assembly includes a locking device comprising first and second locking bodies that are attached to and held in place on the handlebar by the interaction of at least two sets of interdigitated teeth that are interengaged and clamped together to apply a clamping force to the handlebar that securely retains the locking device upon said handlebar. The clamp assembly further includes a cylindrical adjustment body that slidingly telescopes relative to the locking device to thereby adjust a position of the throttle lever upon said handlebar.

The cylindrical adjustment body further comprises an adjustment recess and the locking device further includes an adjustment tooth extending outward from the end flange and corresponding to the adjustment recess. In a locked position, the adjustment tooth of the locking device is in engagement with the adjustment recess of the cylindrical adjustment body to inhibit rotation of the cylindrical adjustment body relative to said handlebar. In an unlocked position, the adjustment tooth of the locking device is completely removed or disengaged from the adjustment recess of the cylindrical adjustment body so that the cylindrical adjustment body can be rotated about said handlebar.

BRIEF DESCRIPTION OF THE DRAWINGS

FIG. 5A is a side, schematic view of the clamp assembly shown in FIG. 4A in a disengaged position;

FIG. 5B is a side, schematic view of the clamp assembly shown in FIG. 4A in an engaged position;

FIG. 7A is a perspective view of a clamp assembly for the adjustable clamping mechanism;

FIG. 7B is a perspective view of the claim assembly shown in FIG. 7A in a locked position;

FIG. 8 is a front perspective view of a second embodiment of an adjustable clamping mechanism on a handlebar;

FIG. 9 is an exploded view of the adjustable clamping mechanism shown in FIG. 8;

DESCRIPTION OF EXAMPLE EMBODIMENTS

Figure 1:
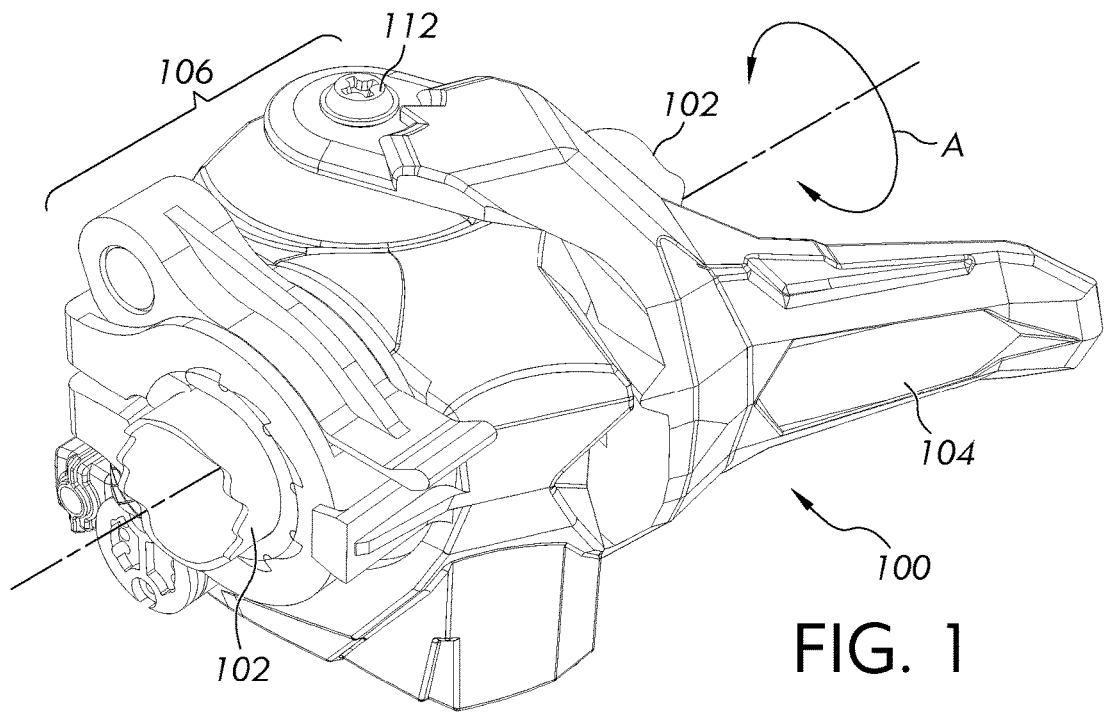
FIG. 1 is a front perspective view of a first embodiment of an adjustable clamping mechanism on a handlebar.

Various vehicles used for recreational purposes (e.g., ATVs, quads, motorcycles, snowmobiles, personal watercrafts, etc.) as well as vehicles used for commercial purposes (e.g., utility vehicles, material handling vehicles, forklifts, etc.) all generally include a throttle control device located on a handlebar. The throttle control device adjusts the speed at which the vehicle is traveling and the handlebar is used for steering the vehicle. The throttle control device comprises a lever or other human-interface control device that is pivotally mounted to the handlebar so that it pivots toward and away from the handlebar in response to an operator's pushing or releasing of the lever. The movement of the throttle lever is used to increase or decrease the speed of the engine. It is to be appreciated that the throttle control device can be mechanical, whereby the speed of the engine is controlled by a physical link to the throttle control lever (such as a cable or the like), or electrical, whereby the speed of the engine is controlled by an electronic control signal that is based upon a sensed position of the throttle control lever (such as via a rotary position sensor or the like), or even combinations thereof. The operator typically uses their thumb to operate the throttle lever with an over-the-handlebar grip while traveling in a forward direction.

Conventionally, the throttle control device is positioned about the handlebar in a specific orientation and then locked in place (e.g., fastening screws, adhesives, etc.). This orientation relates to the position of the operator's wrist on the handlebar when the operator is in a seated position on the vehicle. This orientation is chosen for ease of use for the operator during vehicle use. However, while operating/maneuvering the vehicle, the operator may need to adjust their body position to, for example, be in a standing position or have one knee on a seat of the vehicle among other possible positions. For example, while executing a sharp turn, the operator may lean in the direction of the turn pulling the handlebar closer to the body. The operator's hands and/or arms may be positioned at such a severe angle with respect to one another that, as the operator turns the vehicle, the operator would have to rotate their hand around the handlebar to an under-the-handlebar grip and use their index and/or middle finger to operate the throttle lever.

In some conventional vehicles, an operator can adjust the orientation of the throttle lever by using a screwdriver to manually remove the fastening screws, rotating the throttle control device about the handlebars to a new chosen orientation, and then using the screwdriver to re-secure the throttle control device in the new chosen orientation with the fastening screws. However, this method is time consuming, requires tools, and cannot be performed quickly during normal operation of the vehicle (e.g., it is likely performed by a service center while the vehicle is stationary). Therefore, a need exists for giving a driver the ability to adjust the orientation of the throttle control device quickly and easily, and possibly during operation of the vehicle.

Referring now to the drawings, FIG. 1 shows an adjustable clamping mechanism for a throttle control device 100 on an example handlebar 102 of a vehicle. The handlebar 102 is shown as a cylindrical tube having a cross-sectional shape of a circle. It is to be understood that other geometrical configurations can be used (e.g., a handlebar having a cross-sectional shape of a square, rectangle, triangle, pentagon/hexagon/octagon, polygon, etc.). The image depicts a throttle lever 104 secured to the throttle control device 100. As indicated above, the throttle lever 104 is provided to adjust an engine speed of the vehicle. The throttle lever 104 forms an adjustable arcuate angle with respect to the handlebar 102 and is pivotally movable relative thereto (i.e., towards and away from the handlebar 102). The adjustable clamping mechanism further includes a clamp assembly 106 that retains the throttle control device 100 at a desired angular orientation or position upon said handlebar 102 (i.e., rotate in the direction(s) of arrow A of FIG. 1). Optionally, it is further contemplated that the adjustable clamping mechanism can further retain the throttle control device 100 at a desired lateral position along the length of the handlebar 102.

In an "idle" position of the throttle lever 104, the end of the throttle lever 104 is farthest away from the handlebar 102. In the "idle" position, the throttle lever 104 and an axis of the handlebar 102 form an arcuate angle. When the throttle lever 104 is pivoted toward the handlebar 102, it is in the "drive" position where the angle between the throttle lever 104 and the handlebar axis is smaller than in the "idle" position. Other angular configurations between the throttle lever 104 and the handlebar 102 are also contemplated. The throttle lever 104 can be biased toward the "idle" position such that when no external force is applied to the throttle lever 104 it will pivot toward the "idle" position.

Figure 2:
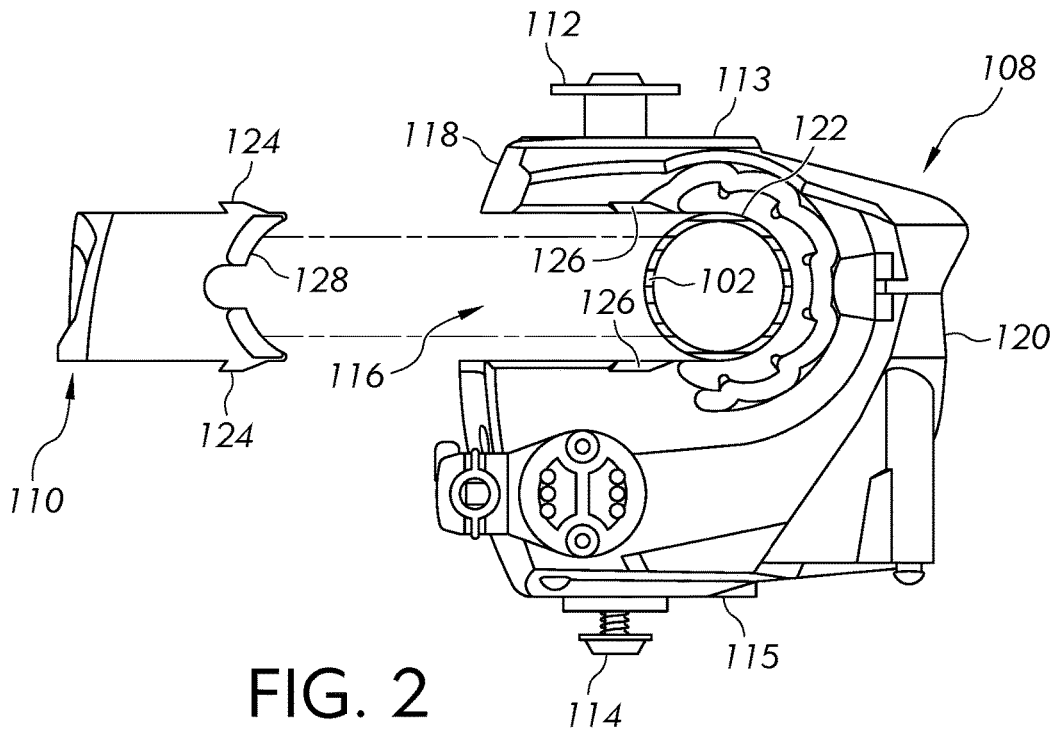
FIG. 2 is a side view of a body of the adjustable clamping mechanism shown in FIG. 1.

With respect to FIGS. 1-2, the clamp assembly 106 includes a body having a main section 108 and a secondary section 110. The throttle lever 104 is movably secured to the main section 108 of the body. Specifically, top and bottom pivot pins 112, 114 are disposed at top and bottom sides 113, 115 of the main section 108, respectively, and the throttle lever 104 is pivotably secured to the body via the top and bottom pivot pins 112, 114. Alternatively, the main section 108 may include only one of the top pivot pin 112 or the bottom pivot pin 114, and the throttle lever 104 may be pivotably secured at a single location thereto. Further still, the throttle lever 104 may be secured to other sides of the main section 108 (i.e., front and/or rear sides, etc.).

As further shown, the main section 108 of the body includes a slot 116 formed therein. Specifically, the slot 116 is formed at a rear side 118 of the throttle control device 100 and extends linearly towards a front side 120 thereof. The slot 116 is sized and shaped to accept the handlebar 102 therein. That is, a height of the slot 116 is slightly greater than a diameter of the handlebar 102 such that, during assembly, the handlebar 102 can slidingly move into and out of the slot 116 in a direction perpendicular to a longitudinal axis of the handlebar 102 (i.e., traversing through the slot 116 in a rearward to forward motion) and in a direction parallel to the longitudinal axis of the handlebar 102 (i.e., sliding into and out of the slot 116 from the rear side 118 of the throttle control device 100).

The slot 116 includes a first interior surface 122 that is formed complimentary to a first portion of a circumferential surface of the handlebar 102. Specifically, the first interior surface 122 of the slot 116 is an inner most wall which defines the slot 116 and is shaped to correspond to the geometry and circumference of the handlebar 102. That is, in an installed position of the throttle control device 100 (i.e., mounted on the handlebar 102), the first portion of the circumferential surface of the handlebar 102 is in continued and uninterrupted contact with the first interior surface 122 of the slot 116.

In conjunction with the depiction of FIG. 1, when fully assembled, the secondary section 110 of the body is disposed within the slot 116; it is also removable with respect to the main section 108. That is, the secondary section 110 of the body is a completely separate and distinct structure with respect to the main section 108. Optionally, it is contemplated that the main section 108 and the secondary section 110 are formed integrally such that the body is a single unitary structure. In this manner, the body may include a through hole formed therein that is adapted to accept the handlebar 102.

With respect to FIG. 2, the secondary section 110 includes securing protrusions 124 formed at top and/or bottom surfaces thereof. The main section 108 of the body includes apertures 126 formed in the slot 116 that correspond to a shape and position of the securing protrusions 124. In this manner the secondary section 110 is slidingly received within the main section 108 of the body. Specifically, the securing protrusions 124 are slidingly received within the apertures 126, along a direction parallel to the longitudinal axis of the handlebar 102, when the secondary section 110 is installed within the main section 108. While it is shown that the secondary section 110 includes two securing protrusions (i.e., one on each of the top and bottom surfaces) it is to be understood that the top and/or bottom surfaces may include any number of securing protrusions which correspond to apertures in the main section. Further still, it is understood that securing protrusion(s) may be located on only the top or bottom surface of the secondary section 110.

Further still, the secondary section 110 of the body includes a second interior surface 128 that is formed complimentary to a second portion of the circumferential surface of the handlebar 102. The second interior surface 128 can be continuous or discontinuous. It is noted that the second portion of the circumferential surface of the handlebar 102 can be different from the first portion of the circumferential surface of the handlebar 102 such that the first and second portions of the circumferential surface of the handlebar 102 do not have overlapping areas. Alternatively, the first and second portions of the circumferential surface of the handlebar 102 can have overlapping areas. Further, it is contemplated that the first and second portions of the circumferential surface of the handlebar 102 may equate to the entire circumferential surface of the handlebar 102. Alternatively, the first and second portions of the circumferential surface of the handlebar 102 may equate to less than the entire circumferential surface of the handlebar 102.

The second interior surface 128 is located at a front side of the secondary section 110 and is shaped to correspond to a circumference of the handlebar 102. That is, in an installed position of the throttle control device 100 (i.e., mounted on the handlebar 102), the second portion of the circumferential surface of the handlebar 102 is in continuous contact with the second interior surface 128 of the secondary section 110.

Figure 3B:
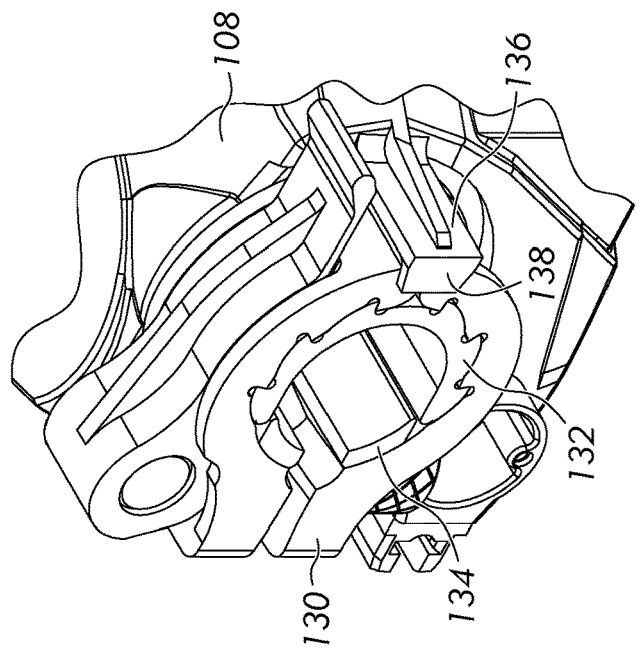
FIG. 3B is a perspective view of the adjustable clamping mechanism shown in FIG. 3A in a locked position.
Figure 3A:
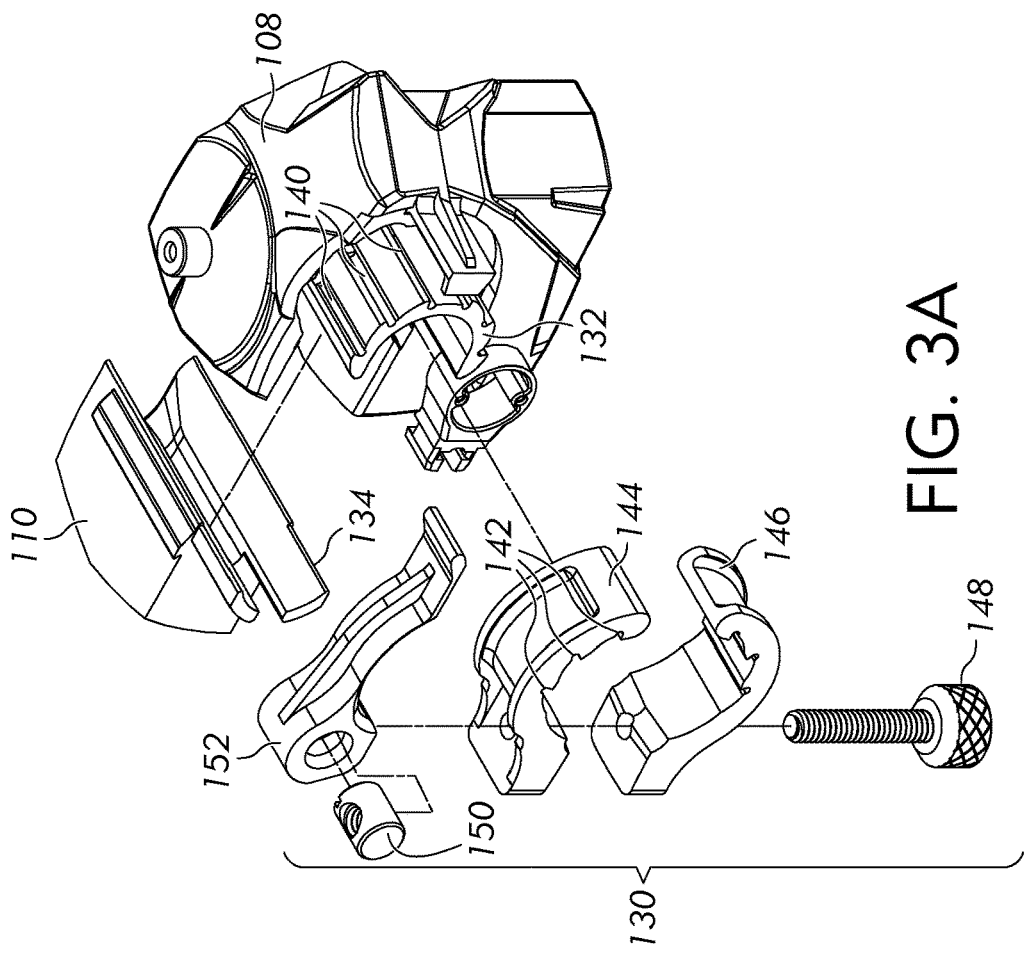
FIG. 3A is an exploded view of an adjustable clamping mechanism.

Moving on to FIG. 3A, the clamp assembly 106 includes a clamping member 130 that is provided to exert a clamping force upon the main section 108 and the secondary section 110 of the body. Specifically, in an engaged position of the clamping member 130, the clamping member 130 provides a clamping force between the main section 108 and the secondary section 110 and upon the handlebar 102 sufficient to thereby retain the throttle lever 104 in a predetermined angular orientation upon said handlebar 102 during operation of the vehicle. Moreover, in a disengaged position of the clamping member 130, the clamping member 130 does not provide the clamping force in order to permit the throttle lever 104 to rotate about the longitudinal axis of the handlebar 102.

In other words, when the clamping member 130 is in the engaged position, a force is applied to the main section 108 and the secondary section 110 of the body in a radial direction with respect to the longitudinal axis of the handlebar 102. In turn, the main section 108 and the secondary section 110 interact with one another, as well as the handlebar 102, in order to secure the throttle control device 100 to the handlebar 102 such that rotational and/or sliding movement of the throttle control device 100 is prohibited. However, when the clamping member 130 is in the disengaged position, there is no substantial force applied to the main section 108 and the secondary section 110 of the body that would constrain movement of the throttle control device 100 on the handlebar 102. That is, an operator is able to freely rotate and/or slide the throttle control device 100 on the handlebar 102 (i.e., rotate in the direction(s) of arrow A of FIG. 1 around the longitudinal axis of the handlebar 102, or optionally slide laterally along the length of the handlebar 102) when the clamping member 130 is in the disengaged position. It is to be appreciated that in an embodiment where the main section 108 and the secondary section 110 are formed integrally such that the body is a single unitary structure, the clamping member in the engaged position will apply the clamping force upon the single body structure about the through hole receiving the handlebar, and upon the handlebar, sufficient to thereby retain the throttle lever in a predetermined angular orientation upon said handlebar.

As further shown in FIG. 3A, the body further comprises an extended member that protrudes outwards and away from the body in an axial direction with respect to the handlebar 102. This enables the clamping member 130 to be positioned laterally to one side of or next to the throttle lever 104. Specifically, the extended member comprises a first segment 132 and a second segment 134. The first segment 132 extends directly outwards from the main section 108 of the body and the second segment 134 extends directly outwards from the secondary section 110 of the body. With respect to FIG. 3B, when the clamping member 130 is in an installed position, the clamping member 130 circumferentially surrounds the extended member (i.e., the first and second segments 132, 134) and is removably installed thereon with respect to the body. That is, the clamping member 130 is completely removable (i.e., no physical contact) from the extended member.

Optionally, the main section 108 of the body further includes a resilient arm member 136 that extends outwards from the body in the axial direction with respect to the handlebar 102. The arm member 136 includes a securing member 138, such as a tooth or hook, at a distal end thereof that is configured to secure the clamping member 130 to the throttle control device 100. Specifically, the securing member 138 extends inwards in a radial direction with respect to the handlebar 102 such that, in the installed position of the clamping member, as shown in FIG. 3B, the securing member 138 engages and retains an outer side of the clamping member 130. In this manner, even if the clamping member 130 is in the disengaged position, the clamping member 130 is prevented from completely disconnecting with the throttle control device 100. As such, the operator would need to intentionally deform the arm member 136 such that securing member 138 no longer engages the outer side of the clamping member 130; thereafter, the clamping member 130 is free to be removed from the throttle control device 100.

As further depicted in FIGS. 3A-3B, the first segment 132 of the extended member includes a first plurality of teeth 140 formed on an outer circumferential surface thereof. Also, the clamping member 130 may also have a second plurality of teeth 142 formed on an inner circumferential surface thereof. As shown, the second plurality of teeth 142 corresponds to the first plurality of teeth 140. That is, the first and second pluralities of teeth 140, 142 are formed complimentary to one another such that they engage one another when the clamping member 130 is in the installed position.

As shown, the clamping member 130 is a band clamp having a first member 144 and a second member 146. The first and second members 144, 146 are formed such that the clamping member 130 is diametrally split along an invisible centerline. In this manner, the first member 144 is separate and distinct from the second member 146. Further, the first and second members 144, 146 are secured to one another at only a single side thereof. Specifically, a bolt 148 passes through through-holes formed in both the first and second members 144, 146 and engages with a threaded member 150 located within a cam lever 152.

Figure 4B:
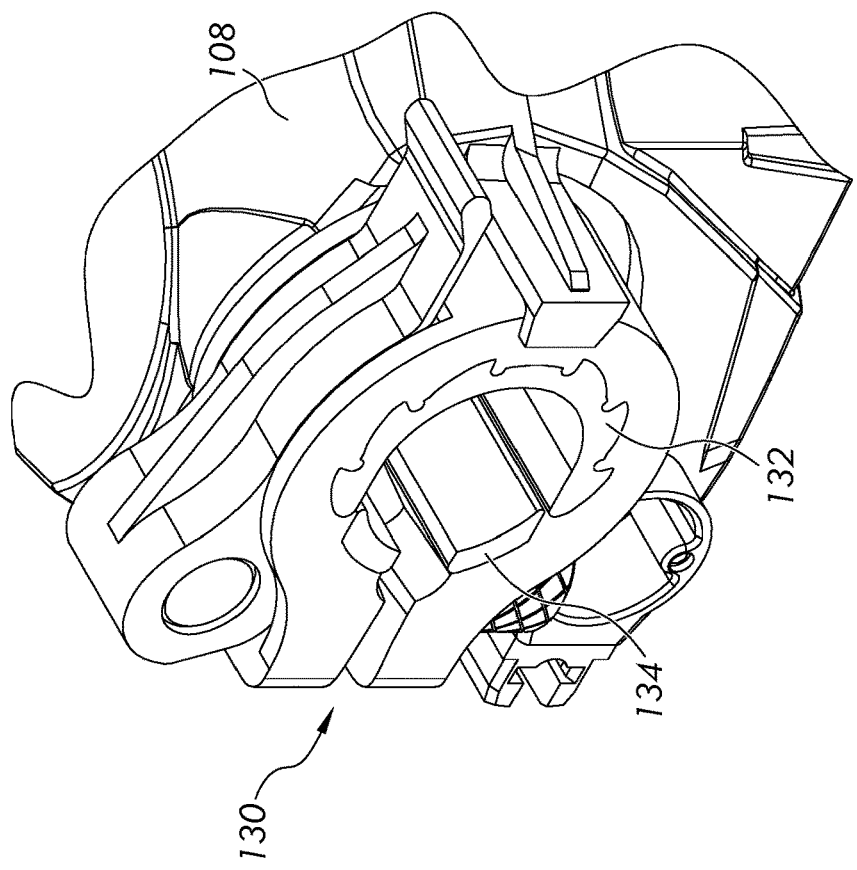
FIG. 4B is a perspective view of the clamp assembly shown in FIG. 4A in a locked position.
Figure 4A:
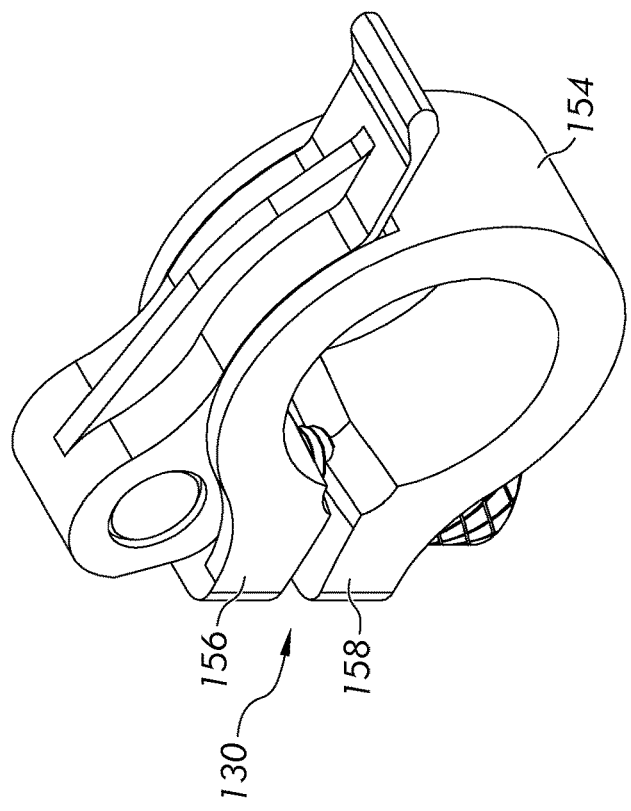
FIG. 4A is a perspective view of a clamp assembly for the adjustable clamping mechanism.

With respect to FIGS. 4A-4B, the clamping member 130 may alternatively be a band clamp comprising a unitary, such as a monolithic, resilient clamp body 154 having a first clamping protrusion 156 disposed adjacent and connected to a second clamping protrusion 158. As shown, the inner circumferential surface of the monolithic resilient clamp body 154 may not include a plurality of teeth thereon. In one embodiment, the monolithic resilient clamp body 154 may be formed of a rigid material, such as hard plastic or metal, that compresses against the first plurality of teeth 140 in a face-to-fact contact with no or little change to the surface(s). In another embodiment, the monolithic resilient clamp body 154 engages with the first plurality of teeth 140 by conforming to the shape of said teeth 140 (when the clamping member is in the engaged position) in order to secure the clamping member 130 on the main and secondary sections 108, 110 of the body. That is, the resilient clamp body 154 may be constructed from a material (e.g., rubber) that elastically deforms when engaging the first plurality of teeth 140, or a material (e.g., plastic or metal) that plastically deforms when engaging the first plurality of teeth 140. Optionally, the monolithic resilient clamp body 154 can include a plurality of teeth similar to the clamping member 130 depicted in FIGS. 3A-3B.

Moving on to FIG. 5A, the clamping member 130 depicted in FIGS. 4A-4B is shown in the disengaged position. Specifically, the cam lever 152 is disposed adjacent the first clamping protrusion 156 and includes a cam surface 160 that is configured to interact with an engagement surface 162 on the clamp body 154. When the clamping member 130 is moved to the engaged position (i.e., FIG. 5B) by rotating the cam lever 152 (which may include an extended handle portion), the cam surface 160 interacts with the engagement surface 162 which closes the distance between the first and second clamping protrusions 156, 158. In other words, the circumference of the inner circumferential surface of the clamping member 130 decreases, thereby providing the clamping force in a radially inwards direction upon the outer surface of the handlebar 102 via the first and second segments of the extended member 132, 134. This configuration provides the operator the ability to adjust the orientation of the throttle control device 100 with his/her hands. That is, the cam lever 152 can be operated by one hand (i.e., via the handle portion in order to move the clamping member 130 into the disengaged position) while the other hand rotates the throttle control device 100 about the handlebar 102. As such, no tools are needed to adjust a position of the throttle control device 100.

Although not shown in the figures, the clamping member 130 depicted in FIGS. 3A-3B provides the clamping force in a similar manner as detailed above. That is, clamp action (i.e., rotating the cam lever 152 such that the cam surface 160 interacts with the engagement surface 162) draws the first member 144 of the clamping member 130 towards the second member 146 of the clamping member 130. Although one example cam clamp is shown in FIGS. 5A-5B, it is to be appreciated that other similar such cam clamps can be used.

Figure 6B:
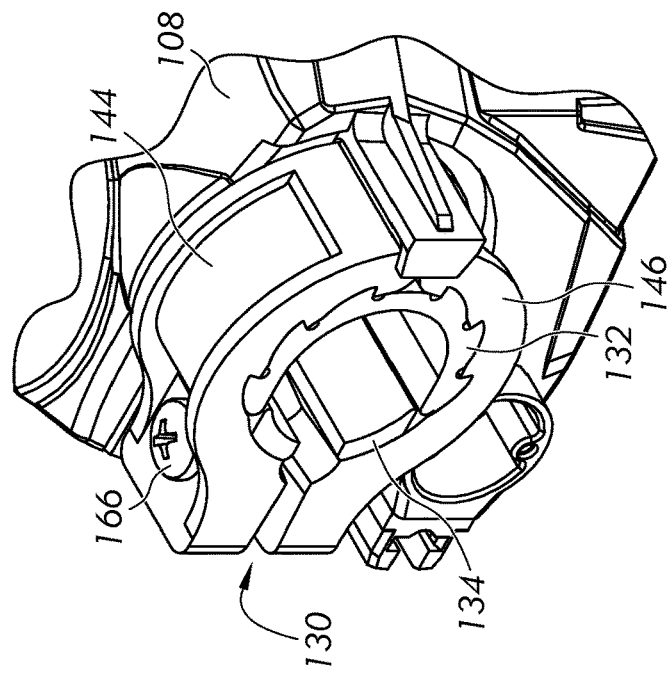
FIG. 6B is a perspective view of the adjustable clamping mechanism shown in FIG. 6A in a locked position.
Figure 6A:
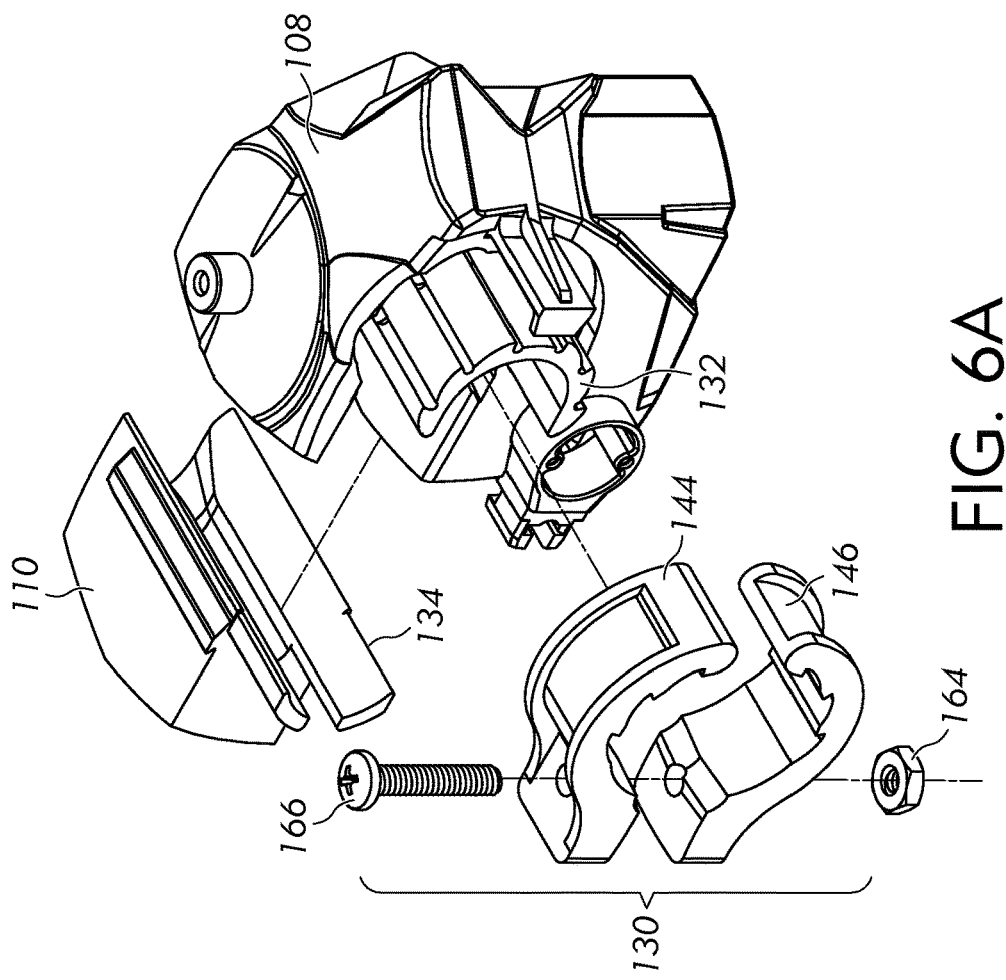
FIG. 6A is an exploded view of an adjustable clamping mechanism.

Alternatively, as depicted in FIGS. 6A-6B, the first and second members 144, 146 of the clamping member 130 depicted in FIGS. 3A-3B can be secured to one another and provide the clamping force via a nut 164 and bolt 166 configuration. That is, the first and second members 144, 146 of the clamping member 130 are secured to one another by a bolt 166 that passes through through-holes formed into the first and second members 144, 146 and engages with a nut 164. Tightening the configuration (i.e., decreasing the distance between the nut 164 and the head of the bolt 166) applies the clamping force. Similarly, as shown in FIGS. 7A-7B, the unitary clamping member 130 depicted in FIGS. 4A-4B can likewise provide the clamping force via a nut 164 and bolt 166 configuration.

Moving on to FIG. 8, a perspective depiction of another embodiment of an adjustable clamping mechanism is shown. Of note, this additional embodiment includes similar environmental features (e.g., handlebar, throttle lever, etc.) that function in a similar manner with respect to the embodiment discussed above. For brevity, the below disclosures will focus mainly on the differences between the separate embodiments.

As shown in FIG. 8, a throttle control device 200 includes a throttle lever 202 and a sensor (not shown) that is at least partially housed within a housing 204. In the shown embodiment, the throttle control device 200 is an electronic throttle control; however, it is understood that the invention could also be used with a mechanical throttle control. The throttle lever 202 has a pivot portion 206 and a lever portion 208. The pivot portion 206 is pivotally fastened to the housing 204 by a screw or other mechanical fastener. The lever portion 208 extends laterally outwards from the pivot portion 206. The operator can grip a handlebar 210 and the throttle lever 202 with their hand and apply force to the throttle lever 202 to thereby pivot it towards or away from the handlebar 210. This pivoting towards the handlebar 210 increases power delivered to the vehicle's engine; conversely, pivoting away decreases the engine power. The throttle lever 202 rotates about a pivot axis, which coincides with a shaft of the screw. In one embodiment, the pivot axis is perpendicular to an axis of the handlebar 210.

In an "idle" position of the throttle lever 202, the end of the throttle lever 202 is farthest away from the handlebar 210. In the "idle" position, the throttle lever 202 and the handlebar axis form an arcuate angle. When the throttle lever 202 is pivoted toward the handlebar 210, it is in the "drive" position where the angle between the throttle lever 202 and the handlebar axis is smaller than in the "idle" position. Other angular configurations between the throttle lever 202 and the handlebar 210 are also contemplated. The throttle lever 202 can be biased toward the "idle" position such that when no external force is applied to the throttle lever 202 it will pivot toward the "idle" position.

Figure 10A:
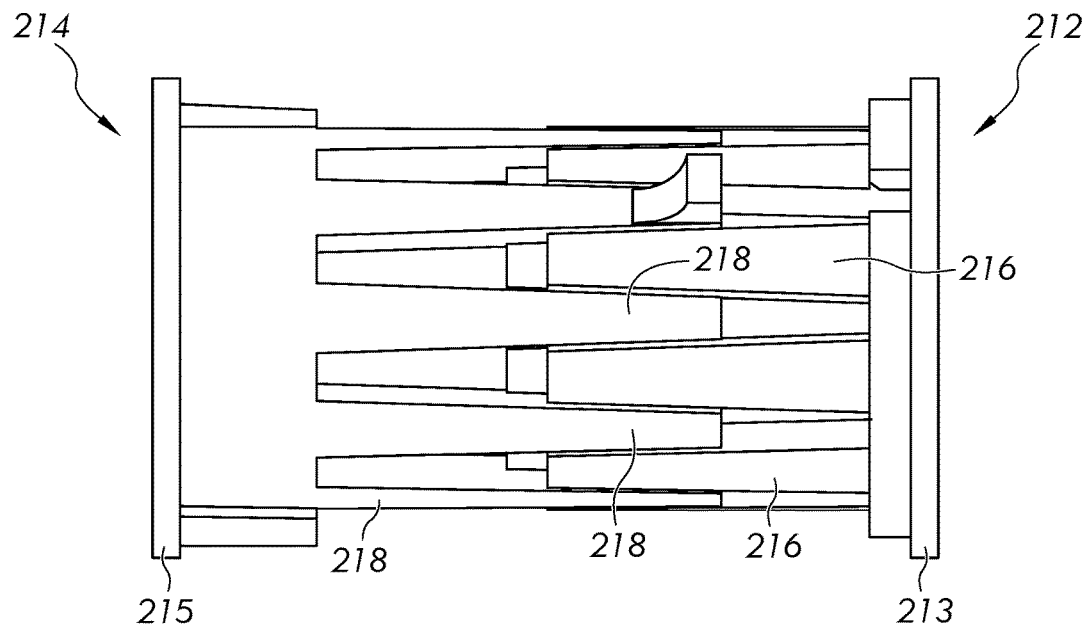
FIG. 10A is a side view of a locking device for the adjustable clamping mechanism, the locking device shown in an unlocked position.
Figure 10B:
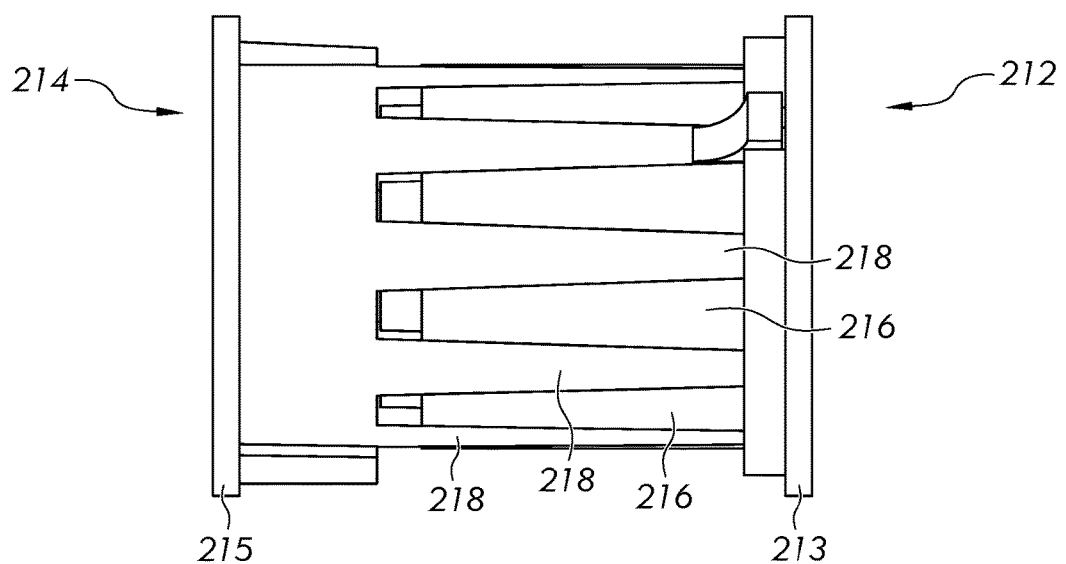
FIG. 10B is a side view of the locking device shown in FIG. 10A, the locking device shown in a locked position.

With respect to FIGS. 9 & 10A-10B, the throttle control device 200 further includes a locking device that is used to attach it to the handlebar 210. Specifically, the locking device comprises a first locking body 212 and a second locking body 214 that are attached to and held in place on the handlebar 210 by the interaction of a first set of integrated teeth 216 (disposed on the first locking body 212) and a second set of integrated teeth 218 (disposed on the second locking body 214) that are clamped together in a direction along the longitudinal axis of the handlebar 210. For example, each of the first and second locking bodies 212, 214 comprises a generally cylindrical, hollow body with a central through-hole that is configured to be fit upon and receive the handlebar 210.

The outer perimeter of each of the first and second locking bodies 212, 214 is formed of elongated teeth that are spaced periodically (at equal, non-equal, or random distances) around the radial perimeter of the locking body. The teeth are elongated in an axial direction of the locking body, and extend outwards from an end flange 213, 215. The teeth, and the troughs between them, of both the first and second locking bodies 212, 214 correspond to one another so that the teeth of one locking body interfit into the troughs of the other locking body, and vice-versa.

Additionally, at least one, and preferably a majority or all, of the elongated teeth of the first and second locking bodies 212, 214 have a tapered, wedge-shaped geometry. In one example, the elongated teeth tapers to a narrower width along the axial direction as they extend outwards from the end flange 213, 215 (i.e., the teeth are narrowest at the distal end, and widest at the proximal end adjacent the end flange 213, 215). Thus, when the first and second locking bodies 212, 214, are originally interfit upon the handlebar 210, the engagement between the first and second sets of integrated teeth 216, 218 is fairly loose. However, when the first and second locking bodies 212, 214 are moved together along the axial direction (i.e., along their longitudinal lengths), as shown in FIG. 10B, the wedge-shaped teeth inter-engage to a greater and greater extent as the first and second locking bodies 212, 214 slide towards each other.

Additionally, the at least one, and preferably a majority or all, of the elongated teeth of the first and second locking bodies 212, 214 have a tapered, wedge-shaped geometry along a second axis, in particular, along the radial axis. For example, the elongated teeth taper outwards to a relatively wider width in a radial direction, such that the teeth are relatively narrower towards the inner diameter and relatively wider towards the outer diameter. Thus, when the first and second locking bodies 212, 214 are moved together along the axial direction (i.e., along their longitudinal lengths), the first and second sets of integrated teeth 216, 216 interengage against one another other along multiple axes. In particular, the wedge-shaped geometry of the teeth along the radial axis act upon each other as a cam to apply a clamping force to the handlebar 210 that securely retains the locking device, and ultimately the throttle control device 200, upon the handlebar 210.

Figure 12:
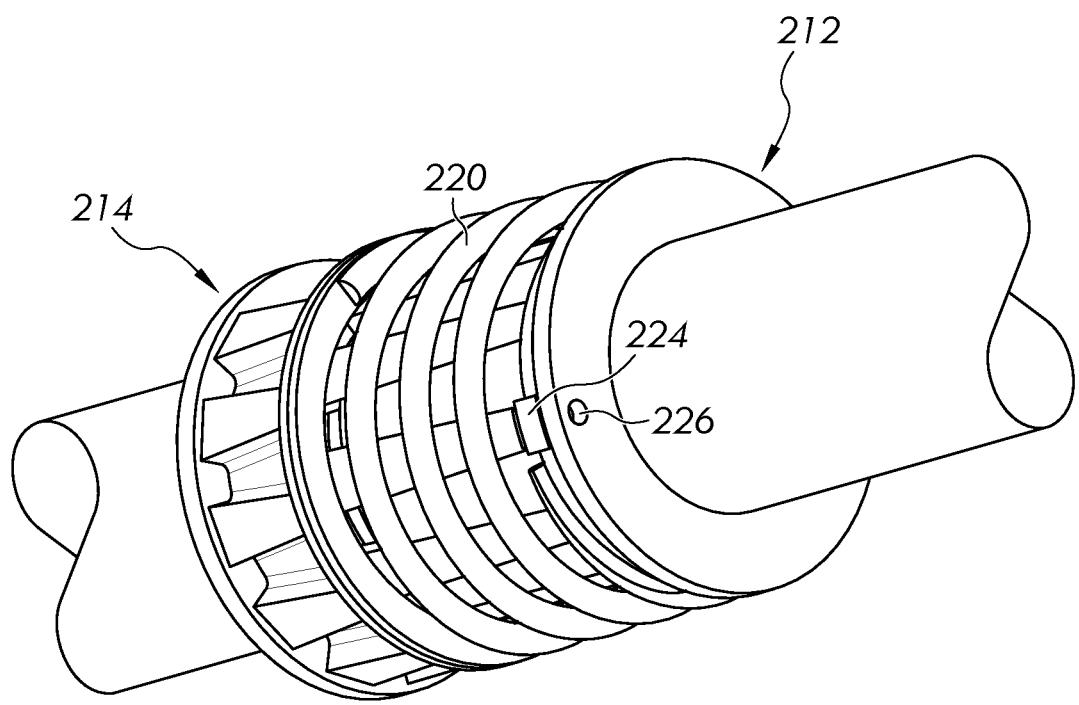
FIG. 12 is a perspective view of the clamp assembly shown in FIG. 11.

When assembled together upon the handlebar 210, the first and second locking bodies 212, 214 can be secured to each other in various manners. In one example, as shown in FIG. 12, the second locking body 214 includes a tooth having an upstanding boss 224 at a distal end thereof. The upstanding boss 224 projects radially outwards and is used to retain a screw or other mechanical fastener. Specifically, the first locking body 212 includes a through-hole 226 that is aligned with the upstanding boss 224 in the axial direction and permits the screw to pass through the first locking body 212 and engage with the upstanding boss 224. This positively secures the locking device to the handlebar 210.

Although not shown, it is to be understood that any number of teeth in either of the first and/or second sets of integrated teeth 216, 218 may include upstanding bosses that are angularly spaced apart (e.g., 90°, 120°, 180°, etc.). The engagement between the screw and the upstanding boss 224 serves to secure the first and second locking bodies 212, 214 together, and by drawing the first and second locking bodies 212, 214 towards each other, also forces the first and second sets of integrated teeth 216, 218 to fully engage with each other, which causes the radial cam structure of the teeth to clamp the first and second locking bodies 212, 214 upon the handlebar 210. Alternatively, the first and second locking bodies 212, 214 can be secured to one another by additional means (e.g., a snap-fit/snap-lock structure, another clamping structure, adhesives, welding, etc.).

Figure 11:
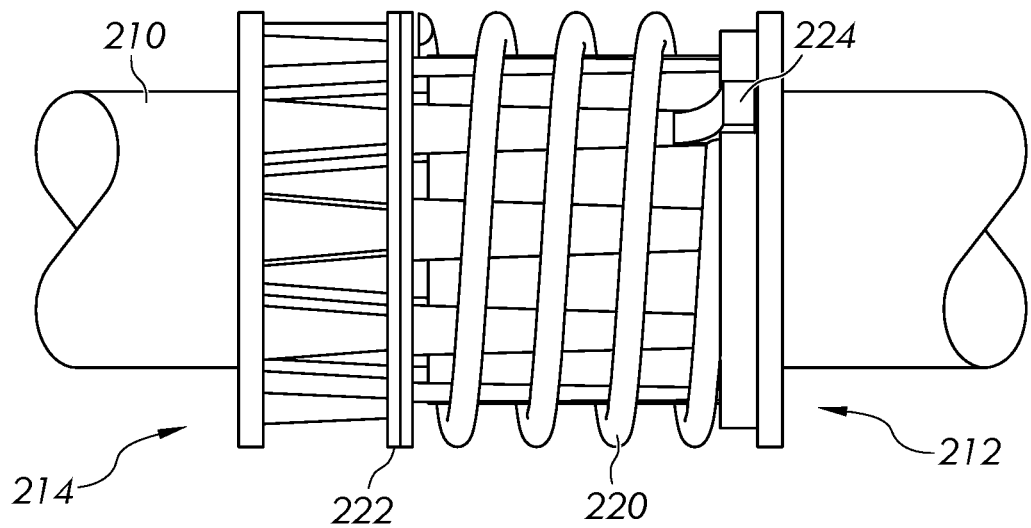
FIG. 11 is a side view of a clamp assembly for the adjustable clamping mechanism upon a handlebar.

As further shown in FIGS. 9, & 11-12, a helical spring 220 is captured around the external perimeter of the first and second sets of integrated teeth 216, 218, and is captured between the end flanges 213, 215 of the first and second locking bodies 212, 214, respectively. The helical spring 220 biases the adjustment mechanism to the locked position when moving the position of the throttle control device 200, as will further be described below. The helical spring 220 can engage the end flange 213, 215 of the first and second locking bodies 212, 214, respectively, directly or indirectly through intermediary structure. For example, one end of the helical spring 220 can rest against upstanding stop(s) that extend longitudinally from one of the end flanges. Optionally, as shown, a washer 222 or the like can be interposed between the helical spring 220 and the upstanding stops to increase the surface area contact and/or to provide an operative surface to compress the helical spring 220 when adjusting the position of the throttle control device 200, as will be described. Although not shown, it is understood that washers 222 can support both ends of the helical spring 220.

Figure 13:
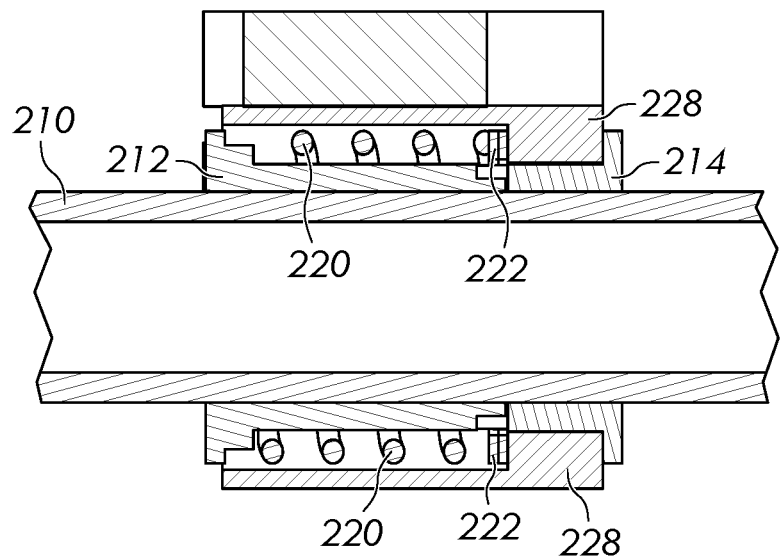
FIG. 13 is a cross-sectional view of a clamp assembly for the adjustable clamping mechanism of FIG. 11.
Figure 14:
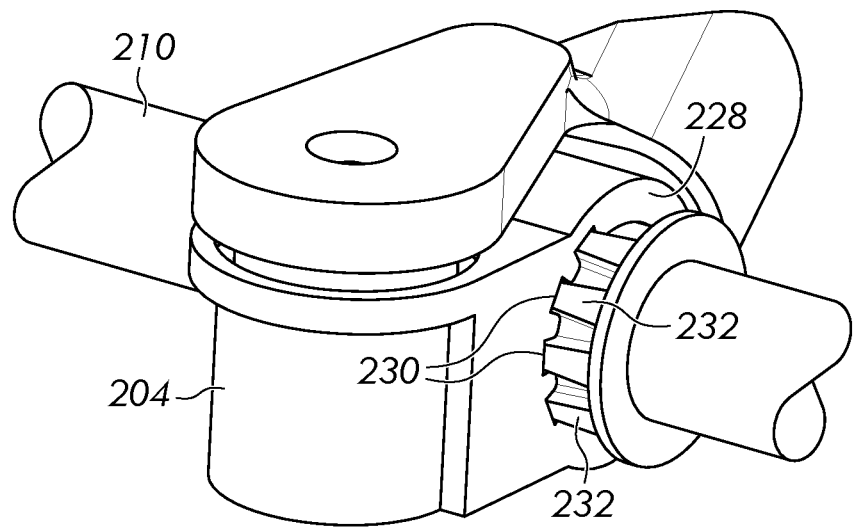
FIG. 14 is a perspective view of the clamp assembly shown in FIG. 13.

Moving on to FIGS. 13-14, the orientation or position of the throttle control device 200 is adjusted upon the handlebar 210 by the interaction of a cylindrical adjustment body 228 that slidingly telescopes relative to the locking device. As shown, the cylindrical adjustment body 228 may be formed integral with the housing 204. The cylindrical adjustment body 228 surrounds the locking device and includes a through-hole extending along the entire longitudinal axis that receives the locking device. The inner diameter of the cylindrical adjustment body 228 is larger than the outer diameter of the locking device such that an annular gap is formed therebetween. The helical spring 220 is located in the gap. An interior end wall of the cylindrical adjustment body 228 is in engagement with the helical spring 220 and/or the washer(s) 222 so that sliding movement of the cylindrical adjustment body 228 upon the handlebar 210 thereby compresses the helical spring 220.

The end wall of the cylindrical adjustment body 228 further comprises at least one axial adjustment recess 230. Preferably, a plurality of adjustment recesses 230 are angularly spaced apart along the perimeter of the interior side of the cylindrical adjustment body 228. As shown, the adjustment recesses 230 can be discretely spaced along about half of the cylindrical adjustment body 228 and can be periodically spaced apart (e.g., 15°, 25°, 30°, etc.) so that the adjustment angles are indexed at predetermined angles. It is to be understood that the number, spacing, and overall distance of the adjustment recesses 230 can correspond to the amount of overall angular adjustment of the throttle control device 200, and discrete adjustment intervals desired for the throttle control device 200 relative to the handlebar 210.

As further shown, the locking device includes at least one adjustment tooth 232 extending outwards from the end flange 215 of the second locking body 214. Preferably, a plurality of adjustment teeth 232 are provided that match the relative size, shape, and positions of the adjustment recesses 230 to enable mating engagement thereof. Thus, the adjustment teeth 232 of the locking device are configured to tightly fit within the adjustment recesses 230 of the cylindrical adjustment body 228.

When the adjustable clamping mechanism includes only a single adjustment tooth 232 configured to be received in a single elongated, angular adjustment recess 230, the position of the throttle control device 200 can be infinitely. Optionally, the adjustable clamping mechanism can include only a single adjustment tooth 232 and the cylindrical adjustment body 228 can include multiple angular adjustment recesses such that the throttle control device 200 can be detented as selected angular intervals to positively hold the throttle control device 200 in place. Further still, the adjustable clamping mechanism can include a plurality of adjustment teeth 232, as shown in FIG. 14, the position of the throttle control device 200 can be detented at selected angular intervals to positively hold the throttle control device 200 in place until some force is applied to click into another detent position. Any number of adjustment teeth 232 consistent with the desired use is contemplated. It is further contemplated that the adjustable clamping mechanism can have a reverse configuration whereby the cylindrical adjustment body 228 includes the adjustment teeth 232 and the locking device includes the adjustment recesses 230, or even combinations thereof (e.g., both the cylindrical adjustment body 228 and the locking device include both adjustment teeth 232 and adjustment recesses 230).

In one example, the at least one adjustment tooth 232 has a tapered profile to more easily align the with the adjustment recess 230; the at least one adjustment recess 230 can have a similar tapered profile. The tapered profile of the adjustment recesses 230 can be relatively wider at the open end to facilitate receiving and guiding of the adjustment teeth 232 therein. Alternatively, the at least one adjustment tooth 232 can have various other profiles (e.g., square, rectangular, etc.) and the at least one adjustment recess 230 can have a suitable corresponding profile. Any shape or configuration of the at least one adjustment tooth 232 and the at least one adjustment recess 230 is contemplated. Preferably, there are multiple adjustment teeth 23 that are simultaneously engaged with multiple adjustment recesses 230 to provide a strong and stable connection between the cylindrical adjustment body 228 and the locking device.

In a locked position, at least one adjustment tooth 232 of the locking device is in engagement with one of the adjustment recesses 230 of the cylindrical adjustment body 228. The interaction between the at least one adjustment tooth 232 and the corresponding adjustment recess 230 of the cylindrical adjustment body 228 prevents further rotation of the throttle control device 200 about the handlebar 210. In an unlocked position, all of the adjustment teeth 232 are completely removed or disengaged from the adjustment recesses 230 so that the cylindrical adjustment body 228 can be rotated about the handlebar 210. It is understood that the adjustment teeth 232 have an overall length that is less than the maximum telescopic movement distance of the cylindrical adjustment body 228 to thereby enable the adjustment teeth 232 to be completely removed from the adjustment recesses 230. The helical spring 220 biases the cylindrical adjustment body 228 towards the locked position whereby the adjustment teeth 232 are biased into engagement with the adjustment recesses 230.

A method of adjusting the second embodiment of the adjustable clamping mechanism will now be described. First, an operator applies a translational force to the cylindrical adjustment body 228 to slidingly telescope it relative to the locking device (i.e., along the longitudinal axis) and handlebar 210. Specifically, the translational force is great enough to overcome the inward biasing force of the helical spring 220. This movement causes disengagement of the adjustment teeth 232 from the adjustment recesses 230.

The cylindrical adjustment body 228 is now in the unlocked position and free to rotate relative to the handlebar 210. The operator, while continuing to apply the translational force, then rotates the throttle control device 200 about the handlebar 210 to a new chosen angular orientation. Once the throttle control device 200 is rotated to the chosen orientation, the operator then stops applying the translational force. As such, the inward biasing force of the helical spring 220 forces the cylindrical adjustment body 228 to the locked position wherein the adjustment teeth 232 engage the adjustment recesses 230.

Optionally, the operator can intentionally misalign the adjustment teeth 232 and the adjustment recesses 230 so that the throttle control device 200 remains in the unlocked position even when the operator is no longer applying the translational force. However, further rotation of the throttle control device 200 would enable the helical spring 220 to re-engage the adjustment teeth 232 and the adjustment recesses 230.

It is further contemplated that the device can be configured to defeat attempts to misalign the adjustment teeth 232 and the adjustment recesses 230 so that the cylindrical adjustment body 228 must be in the locked position when the operator releases the translational force. Such a configuration could be accomplished variously, such as by way of a modified adjustment tooth 232 and adjustment recess 230 design, and/or a keyed design that resists placement of the cylindrical adjustment body 228 in an intermediate position. Alternatively, the adjustable clamping mechanism can include a torsional spring that acts upon the cylindrical adjustment body 228 to rotationally force it away from an intermediate position and into the locked position (e.g., engagement of the adjustment teeth 232 and the adjustment recesses 230).

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. An adjustable clamping mechanism for a throttle control device on a handlebar of a vehicle, the adjustable clamping mechanism comprising:
   a throttle lever that forms an adjustable arcuate angle with respect to said handlebar and is pivotally movable relative thereto, the throttle lever provided to adjust an engine speed of said vehicle; and
   a clamp assembly that retains the throttle control device at a desired angular position upon said handlebar, the clamp assembly comprising:
      a body including a main section and a secondary section, the main section having a slot formed therein that is adapted to accept said handlebar, the slot including a first interior surface that is formed complimentary to a first portion of a circumferential surface of said handlebar, the secondary section being disposed in the slot and removable with respect to the main section, the secondary section having a second interior surface that is formed complimentary to a second portion of the circumferential surface of the handlebar; and a clamping member provided to exert a clamping force upon the main section and secondary section of the body, wherein, in an engaged position of the clamping member, the clamping member provides a clamping force between the main section and the secondary section and upon the handlebar sufficient to thereby retain the throttle lever in a predetermined angular orientation upon said handlebar during operation of said vehicle, and wherein, in a disengaged position of the clamping member, the clamping member does not provide the clamping force in order to permit the throttle lever to rotate about a longitudinal axis of said handlebar.

2. The adjustable clamping mechanism of claim 1, the body further comprising an extended member that protrudes away from the body in an axial direction with respect to the handlebar, the clamping member circumferentially surrounding the extended member and being removably installed thereon with respect to the body.

3. The adjustable clamping mechanism of claim 2, the extended member comprising first and second segments, the first segment extending directly outwards from the main section of the body and the second segment extending directly outwards from the secondary section of the body.

4. The adjustable clamping mechanism of claim 3, the first segment of the extended member including a first plurality of teeth formed on an outer circumferential surface thereof.

5. The adjustable clamping mechanism of claim 4, the clamping member having a second plurality of teeth formed on an inner circumferential surface thereof, the second plurality of teeth corresponding to the first plurality of teeth.

6. The adjustable clamping mechanism of claim 5, wherein the clamping member is a band clamp further comprising a first member that is separate and distinct from a second member, the first and second members being secured to one another at only a single side thereof.

7. The adjustable clamping mechanism of claim 6, the clamping member further comprising a cam lever disposed adjacent the first member, the cam lever including a cam surface that is configured to interact with an engagement surface on the first member such that:

in the engaged position of the clamping member, the cam surface interacts with the engagement surface in order to provide the clamping force, and in the disengaged position of the clamping member, the cam surface does not interact with the engagement surface thereby not providing the clamping force.

8. The adjustable clamping mechanism of claim 7, the main section of the body further comprising a resilient arm member extending outwards in the axial direction with respect to the handlebar, the resilient arm member including a securing member at a distal end thereof, and the securing member extending in a radial direction such that, in an installed position of the clamping member, the securing member engages an outer side of the clamping member.

9. The adjustable clamping mechanism of claim 6, the first and second members being secured to one another by a nut and bolt configuration.

10. The adjustable clamping mechanism of claim 4, wherein the clamping member is a band clamp comprising a monolithic resilient clamp body including a first clamping protrusion disposed adjacent a second clamping protrusion.

11. The adjustable clamping mechanism of claim 10, the clamping member further comprising a cam lever disposed adjacent the first clamping protrusion, the cam lever including a cam surface that is configured to interact with an engagement surface on the resilient clamp body such that:

in the engaged position of the clamping member, the cam surface interacts with the engagement surface in order to provide the clamping force throughout the resilient clamp body, and in the disengaged position of the clamping member, the cam surface does not interact with the engagement surface thereby not providing the clamping force.

12. The adjustable clamping mechanism of claim 11, the main section of the body further comprising a resilient arm member extending outwards in the axial direction with respect to the handlebar, the resilient arm member including a securing member at a distal end thereof, the securing member extending in a radial direction such that, in an installed position of the clamping member, the securing member engages an outer side of the clamping member.

13. The adjustable clamping mechanism of claim 10, the first and second clamping protrusions being secured to one another by a nut and bolt configuration.

14. The adjustable clamping mechanism of claim 1, the secondary section of the body including a securing protrusion and the main section of the body including an aperture corresponding to a shape of the securing protrusion such that the securing protrusion is slidingly received within the aperture when the secondary section is disposed within the main section.

15. The adjustable clamping mechanism of claim 1, wherein the throttle lever is movably secured to the main section of the body.

16. The adjustable clamping mechanism of claim 15, wherein the throttle lever is pivotably secured to the body at a top side and a bottom side of the main section.

* * * * *